US012628059B2

(12) United States Patent
Gürsu et al.

(10) Patent No.: US 12,628,059 B2
(45) Date of Patent: May 12, 2026

(54) MOBILITY CONTROL IN CONNECTION OF NETWORK SLICES

(71) Applicant: Nokia Technologies Oy, Espoo (FI)

(72) Inventors: Halit Murat Gürsu, Munich (DE); Philippe Godin, Massy (FR); Ahmad Awada, Munich (DE); Muhammad Naseer-Ul-Islam, Munich (DE); Ömer Bulakci, Munich (DE)

(73) Assignee: Nokia Technologies Oy, Espoo (FI)

( * ) Notice: Subject to any disclaimer, the term of this patent is extended or adjusted under 35 U.S.C. 154(b) by 472 days.

(21) Appl. No.: 18/557,770

(22) PCT Filed: May 19, 2022

(86) PCT No.: PCT/FI2022/050338
§ 371 (c)(1),
(2) Date: Oct. 27, 2023

(87) PCT Pub. No.: WO2022/258881
PCT Pub. Date: Dec. 15, 2022

(65) Prior Publication Data
US 2024/0214894 A1 Jun. 27, 2024

Related U.S. Application Data

(60) Provisional application No. 63/209,431, filed on Jun. 11, 2021.

(51) Int. Cl.
*H04W 36/00* (2009.01)
*H04W 36/18* (2009.01)

(52) U.S. Cl.
CPC ........ *H04W 36/13* (2023.05); *H04W 36/0011* (2013.01); *H04W 36/18* (2013.01)

(58) Field of Classification Search
CPC . H04W 36/13; H04W 36/0011; H04W 36/18; H04W 8/22; H04W 36/0061; H04W 36/22
See application file for complete search history.

(56) References Cited

U.S. PATENT DOCUMENTS 11,917,460 B2 * 2/2024 Awoniyi-Oteri ...... H04W 72/23
12,177,921 B2 * 12/2024 You ........................ H04W 24/08
(Continued)

FOREIGN PATENT DOCUMENTS

WO 2020/034983 A1 2/2020
WO 2021/029799 A1 2/2021
(Continued)

OTHER PUBLICATIONS

Extended European Search Report received for corresponding European Patent Application No. 22819696.0, dated Apr. 15, 2025, 7 pages.
(Continued)

*Primary Examiner* — Dhaval V Patel
(74) *Attorney, Agent, or Firm* — Nokia Technologies Oy

(57) ABSTRACT

There is provided a method, comprising: communicating a first data session on a first network slice with a source network node; receiving an indication indicating whether or not mapping the first data session to a second data session at a target network node requires switching to a second network slice, wherein the user equipment is equipped with a dual active protocol stack enabling the user equipment to communicate with the source network node and with the target network node during the handover process of the apparatus from a source cell provided by the source network node to a target cell provided by the target network node; deciding to continue the first data session on the first network slice with the source network node during the handover process; and deciding, based on the indication, (Continued)

when to start user plane data communication on the second data session with the target network node.

20 Claims, 7 Drawing Sheets

(56)                References Cited

U.S. PATENT DOCUMENTS

| | | | | |
|---|---|---|---|---|
| 12,200,478 | B2 * | 1/2025 | Wallentin | .............. H04W 76/30 |
| 2018/0368140 | A1 | 12/2018 | Centonza et al. | |
| 2019/0261233 | A1 | 8/2019 | Duan et al. | |
| 2020/0022061 | A1 | 1/2020 | Jin et al. | |
| 2020/0053803 | A1 | 2/2020 | Youn et al. | |
| 2020/0314714 | A1 | 10/2020 | Jung et al. | |
| 2023/0276306 | A1 * | 8/2023 | Jimenez Cordon | .......................... |
| | | | | H04W 36/0011 |
| | | | | 370/331 |
| 2023/0379775 | A1 * | 11/2023 | Dauneria | .......... H04W 36/0011 |
| 2024/0163746 | A1 * | 5/2024 | Belleschi | .......... H04W 36/0079 |
| 2025/0048223 | A1 * | 2/2025 | Chandrashekar | .......................... |
| | | | | H04W 36/0072 |

FOREIGN PATENT DOCUMENTS

| | | | |
|---|---|---|---|
| WO | 2021/086249 | A1 | 5/2021 |
| WO | 2022/078611 | A1 | 4/2022 |

OTHER PUBLICATIONS

"3rd Generation Partnership Project; Technical Specification Group Radio Access Network; NR; NR and NG-RAN Overall Description; Stage 2 (Release 16)", 3GPP TS 38.300, V16.3.0, Sep. 2020, pp. 1-148.

"DAPS HO—per-DRB Handover Preparation", 3GPP TSG-RAN WG3 Meeting #107-e, R3-201073, Ericsson, Agenda Item: 15.2.1, Feb. 24-Mar. 6, 2020, 18 pages.

"3rd Generation Partnership Project; Technical Specification Group Radio Access Network; NR; NR and NG-RAN Overall Description; Stage 2 (Release 16)", 3GPP TS 38.300, V16.4.0, Dec. 2020, pp. 1-149.

"3rd Generation Partnership Project; Technical Specification Group Radio Access Network; NG-RAN; Xn application protocol (XnAP) (Release 16)", 3GPP TS 38.423, V16.4.0, Jan. 2021, pp. 1-457.

"3rd Generation Partnership Project; Technical Specification Group Services and System Aspects; System architecture for the 5G System (5GS); Stage 2 (Release 16)", 3GPP TS 23.501, V16.7.0, Dec. 2020, pp. 1-450.

"3rd Generation Partnership Project; Technical Specification Group Core Network and Terminals; Numbering, addressing and identification; (Release 17)", 3GPP TS 23.003, V17.0.0, Dec. 2020, pp. 1-142.

"Email discussion on open issues for RAN slicing SI", 3GPP TSG-RAN WG2 Meeting #112 electronic, R2-2010366, Agenda Item: 8.8.1, CMCC, Nov. 2-13, 2020, pp. 1-69.

"Msc-generator", Sourceforge, Retrieved on Oct. 19, 2023, Webpage available at : https://sourceforge.net/projects/msc-generator/.

"Further consideration on additional issues for slice remapping", 3GPP TSG-RAN WG3 #110-e, R3-206806, Agenda item: 17.2, LG Electronics Inc., Nov. 2-12, 2020, 3 pages.

"IEEE 802.11", Wikipedia, Retrieved on Oct. 19, 2023, Webpage available at : https://en.wikipedia.org/wiki/IEEE_802.11.

"3rd Generation Partnership Project; Technical Specification Group RAN; NR; Study on enhancement of Radio Access Network (RAN) slicing (Release 17)", 3GPP TR 38.832, V1.0.0, Mar. 2021, 31 pages.

International Search Report and Written Opinion received for corresponding Patent Cooperation Treaty Application No. PCT/FI2022/050338, dated Aug. 17, 2022, 14 pages.

"Connected mode mobility with slicing", 3GPP TSG-RAN WG3#95bis, R3-171116, Agenda item: 10.3, Nokia, Apr. 3-7, 2017, pp. 1-5.

* cited by examiner

| 120/122 UE | | 112 e/gNB |
|---|---|---|

MSG1: PREAMBLE

MSG2: RAR

MSG3: RRC CONNECTION REQUEST

MSG4: CONTENTION RESOLUTION

RRC RESPONSE+SETUP

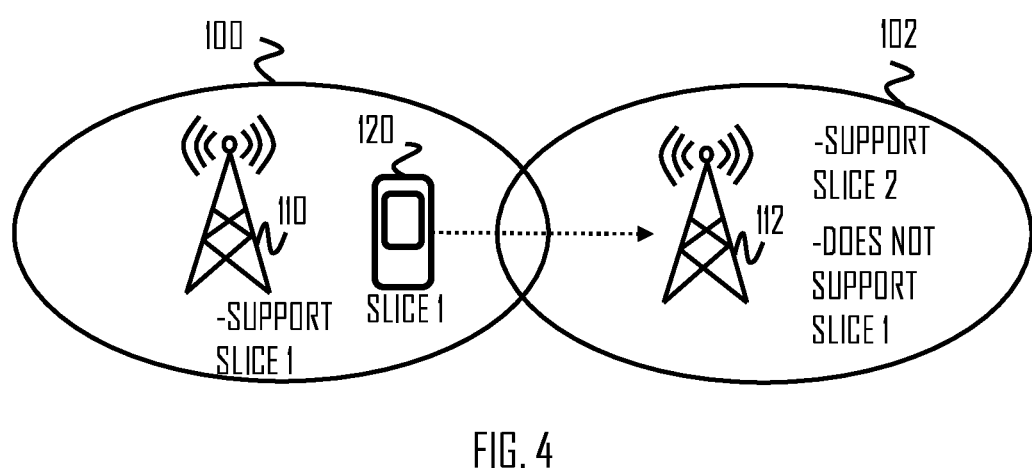

FIG. 4

600: COMMUNICATE A FIRST DATA SESSION ON
A FIRST NETWORK SLICE WITH A SOURCE NETWORK NODE

602: RECEIVE AN INDICATION INDICATING WHETHER OR NOT MAPPING THE FIRST
DATA SESSION TO A SECOND DATA SESSION AT A TARGET NETWORK NODE REQUIRES
SWITCHING TO A SECOND NETWORK SLICE

604: DECIDE TO CONTINUE THE FIRST DATA SESSION ON THE FIRST NETWORK SLICE
WITH THE SOURCE NETWORK NODE DURING THE HANDOVER PROCESS

606: DECIDE, BASED ON THE INDICATION, WHEN TO START USER PLANE DATA COMMUNICATION
ON THE SECOND DATA SESSION WITH THE TARGET NETWORK NODE

608: NO SLICE CHANGE →
START USER PLANE DATA COM.
WITH THE TARGET
UPON COMPLETION OF RACH

610: SLICE CHANGE → START USER
PLANE DATA COM. WITH THE TARGET
ON THE SECOND DATA SESSION
UPON SLICE REMAPPING IS DONE

FIG. 6

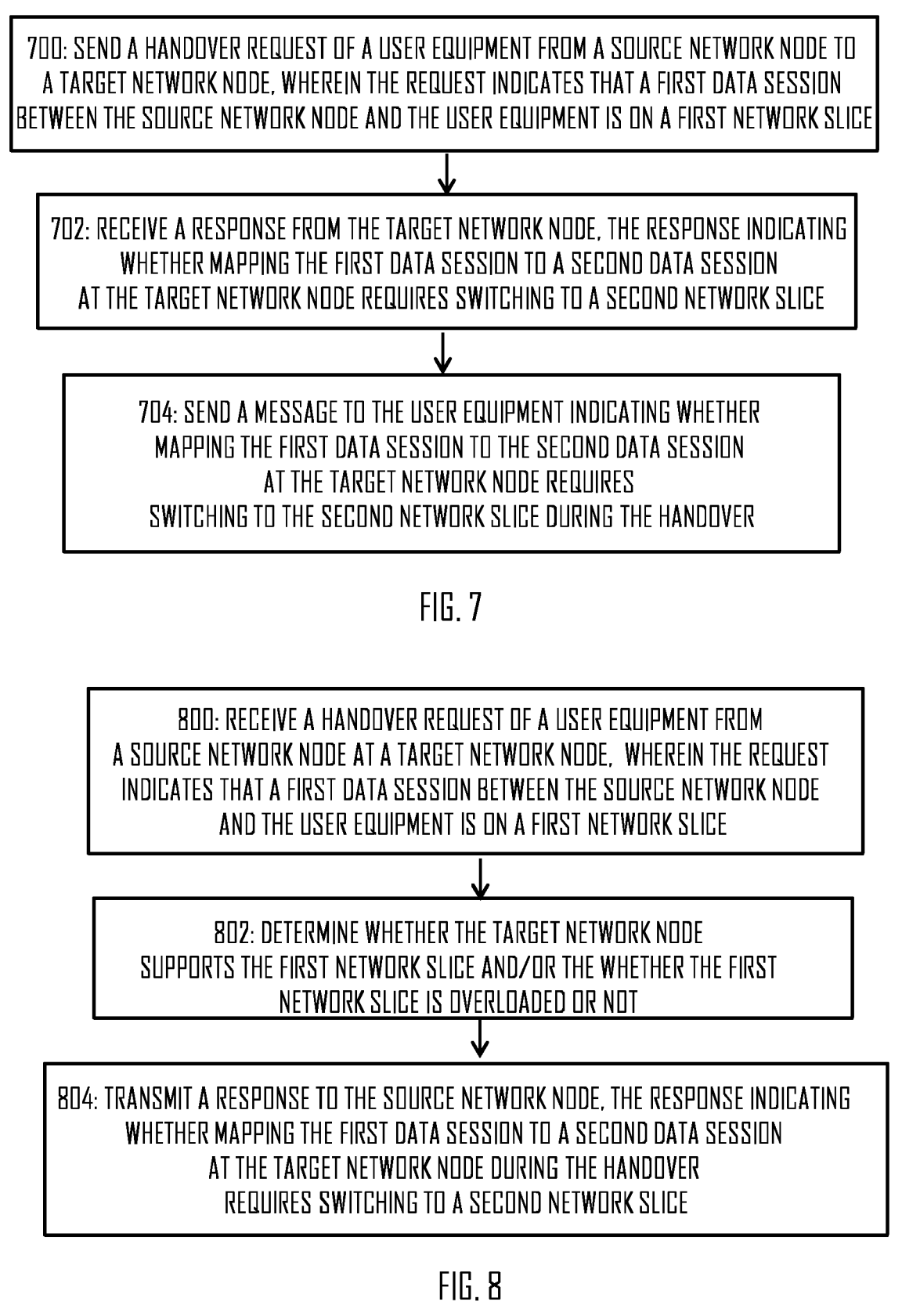

700: SEND A HANDOVER REQUEST OF A USER EQUIPMENT FROM A SOURCE NETWORK NODE TO A TARGET NETWORK NODE, WHEREIN THE REQUEST INDICATES THAT A FIRST DATA SESSION BETWEEN THE SOURCE NETWORK NODE AND THE USER EQUIPMENT IS ON A FIRST NETWORK SLICE

702: RECEIVE A RESPONSE FROM THE TARGET NETWORK NODE, THE RESPONSE INDICATING WHETHER MAPPING THE FIRST DATA SESSION TO A SECOND DATA SESSION AT THE TARGET NETWORK NODE REQUIRES SWITCHING TO A SECOND NETWORK SLICE

704: SEND A MESSAGE TO THE USER EQUIPMENT INDICATING WHETHER MAPPING THE FIRST DATA SESSION TO THE SECOND DATA SESSION AT THE TARGET NETWORK NODE REQUIRES SWITCHING TO THE SECOND NETWORK SLICE DURING THE HANDOVER

FIG. 7

800: RECEIVE A HANDOVER REQUEST OF A USER EQUIPMENT FROM A SOURCE NETWORK NODE AT A TARGET NETWORK NODE, WHEREIN THE REQUEST INDICATES THAT A FIRST DATA SESSION BETWEEN THE SOURCE NETWORK NODE AND THE USER EQUIPMENT IS ON A FIRST NETWORK SLICE

802: DETERMINE WHETHER THE TARGET NETWORK NODE SUPPORTS THE FIRST NETWORK SLICE AND/OR THE WHETHER THE FIRST NETWORK SLICE IS OVERLOADED OR NOT

804: TRANSMIT A RESPONSE TO THE SOURCE NETWORK NODE, THE RESPONSE INDICATING WHETHER MAPPING THE FIRST DATA SESSION TO A SECOND DATA SESSION AT THE TARGET NETWORK NODE DURING THE HANDOVER REQUIRES SWITCHING TO A SECOND NETWORK SLICE

FIG. 8

MOBILITY CONTROL IN CONNECTION OF NETWORK SLICES

RELATED APPLICATION

This application was originally filed as a Patent Cooperation Treaty Application No. PCT/FI2022/050338 filed on May 19, 2022, which claims priority of a U.S. provisional application No. 63/209,431 filed on Jun. 11, 2021, both of which are hereby incorporated in their entirety.

TECHNICAL FIELD

Various example embodiments relate generally to mobility control, such as handovers, in connection of network slices.

BACKGROUND

It is common to handover a user equipment (UE) to another cell from a source cell when the UE moves across cell coverage areas. There is a need to avoid handover failures while keeping service/slice requirements, e.g., high data throughput, without large interruptions.

BRIEF DESCRIPTION

According to some aspects, there is provided the subject matter of the independent claims. Some further aspects are defined in the dependent claims.

LIST OF THE DRAWINGS

In the following, the invention will be described in greater detail with reference to the embodiments and the accompanying drawings, in which FIG. 1 presents a wireless communication network, according to an embodiment;

FIG. 4 shows a scenario where legacy handover may cause issues, according to some embodiments

FIG. 6-8 show methods, according to some embodiments;

DESCRIPTION OF EMBODIMENTS

Figures 1, 2:
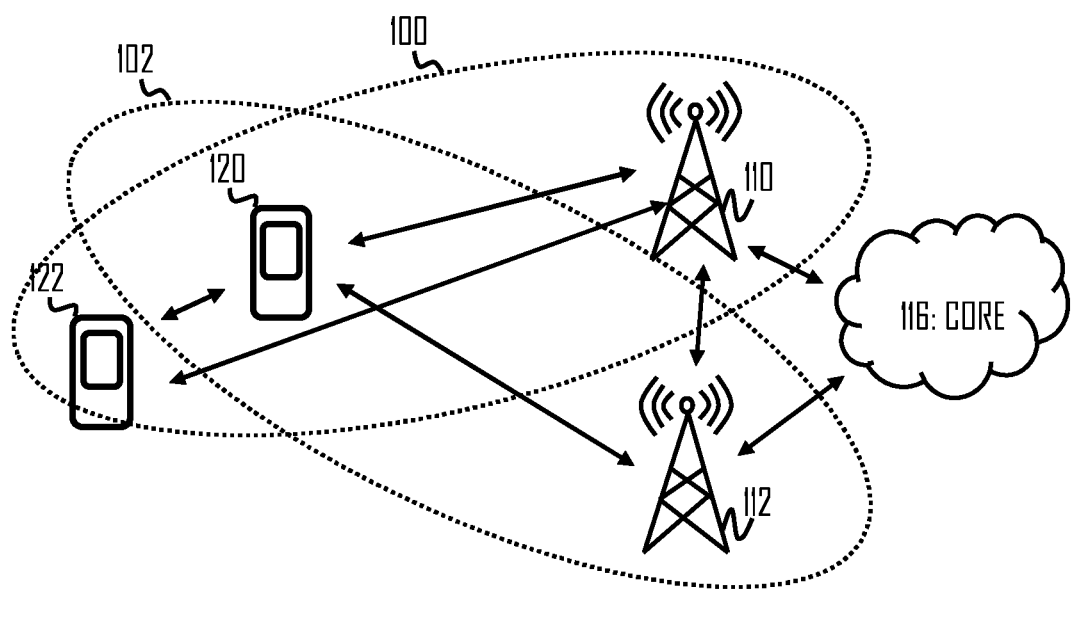
FIG. 2 shows a connection establishment procedure, according to an embodiment.

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments. For the purposes of the present disclosure, the phrases "A or B" and "A and/or B" means (A), (B), or (A and B). For the purposes of the present disclosure, the phrase "A, B, and/or C" means (A), (B), (C), (A and B), (A and C), (B and C), or (A, B, and C).

Embodiments described may be implemented in a radio system, such as one comprising at least one of the following radio access technologies (RATs): Worldwide Interoperability for Micro-wave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced, and enhanced LTE (eLTE). Term 'eLTE' here denotes the LTE evolution that connects to a 5G core. LTE is also known as evolved UMTS terrestrial radio access (EUTRA) or as evolved UMTS terrestrial radio access network (EUTRAN). A term "resource" may refer to radio resources, such as a physical resource block (PRB), a radio frame, a subframe, a time slot, a subband, a frequency region, a subcarrier, a beam, etc. The term "transmission" and/or "reception" may refer to wirelessly transmitting and/or receiving via a wireless propagation channel on radio resources The embodiments are not, however, restricted to the systems/RATs given as an example but a person skilled in the art may apply the solution to other communication systems provided with necessary properties. One example of a suitable communications system is the 5G system. The 3GPP solution to 5G is referred to as New Radio (NR). 5G has been envisaged to use multiple-input-multiple-output (MIMO) multi-antenna transmission techniques, more base stations or nodes than the current network deployments of LTE (a so-called small cell concept), including macro sites operating in co-operation with smaller local area access nodes and perhaps also employing a variety of radio technologies for better coverage and enhanced data rates. 5G will likely be comprised of more than one radio access technology/radio access network (RAT/RAN), each optimized for certain use cases and/or spectrum. 5G mobile communications may have a wider range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and being integrable with existing legacy radio access technologies, such as the LTE.

The current architecture in LTE networks is distributed in the radio and centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications). Edge cloud may be brought into RAN by utilizing network function virtualization (NVF) and software defined networking (SDN). Using edge cloud may mean access node operations to be carried out, at least partly, in a server, host or node operationally coupled to a remote radio head or base station comprising radio parts. Network slicing allows multiple virtual networks to be created on top of a common shared physical infrastructure. The virtual networks are then customised to meet the specific needs of applications, services, devices, customers or operators.

In radio communications, node operations may in be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labour between core network operations and base station operations may vary depending on implementation. Thus, 5G networks architecture may be based on a so-called CU-DU split. One gNB-CU controls several gNB-DUs. The term 'gNB' may correspond in 5G to the eNB in LTE. The gNBs (one or more) may communicate with one or more UEs. The gNB-CU (central node) may control a plurality of spatially separated gNB-DUs, acting at least as transmit/receive (Tx/Rx) nodes. In some embodiments, however, the gNB-DUs (also called DU) may comprise e.g. a radio link control (RLC), medium access control (MAC) layer and a physical (PHY) layer, whereas the gNB-CU (also called a CU) may comprise the layers above RLC layer, such as a packet data convergence protocol (PDCP) layer, a radio resource control (RRC) and an internet protocol (IP) layers. Other functional splits are possible too. It is considered that skilled person is familiar with the OSI model and the functionalities within each layer.

In an embodiment, the server or CU may generate a virtual network through which the server communicates with the radio node. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Some other technology advancements probably to be used are Software-Defined Networking (SDN), Big Data, and all-IP, to mention only a few non-limiting examples. For example, network slicing may be a form of virtual network architecture using the same principles behind software defined networking (SDN) and network functions virtualisation (NFV) in fixed networks. SDN and NFV may deliver greater network flexibility by allowing traditional network architectures to be partitioned into virtual elements that can be linked (also through software). Network slicing allows multiple virtual networks to be created on top of a common shared physical infrastructure. The virtual networks are then customised to meet the specific needs of applications, services, devices, customers or operators.

The plurality of gNBs (access points/nodes), each comprising the CU and one or more DUs, may be connected to each other via the Xn interface over which the gNBs may negotiate. The gNBs may also be connected over next generation (NG) interfaces to a 5G core network (5GC), which may be a 5G equivalent for the core network of LTE.

Such 5G CU-DU split architecture may be implemented using cloud/server so that the CU having higher layers locates in the cloud and the DU is closer to or comprises actual radio and antenna unit. There are similar plans ongoing for LTE/LTE-A/eLTE as well. When both eLTE and 5G will use similar architecture in a same cloud hardware (HW), the next step may be to combine software (SW) so that one common SW controls both radio access networks/technologies (RAN/RAT). This may allow then new ways to control radio resources of both RANs. Furthermore, it may be possible to have configurations where the full protocol stack is controlled by the same HW and handled by the same radio unit as the CU.

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future rail-way/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

The embodiments may be also applicable to narrow-band (NB) Internet-of-things (IoT) systems which may enable a wide range of devices and services to be connected using cellular telecommunications bands. NB-IoT is a narrowband radio technology designed for the Internet of Things (IoT) and is one of technologies standardized by the 3rd Generation Partnership Project (3GPP). Other 3GPP IoT technologies also suitable to implement the embodiments include machine type communication (MTC) and eMTC (enhanced Machine-Type Communication). NB-IoT focuses specifically on low cost, long battery life, and enabling a large number of connected devices. The NB-IoT technology is deployed "in-band" in spectrum allocated to Long Term Evolution (LTE)—using resource blocks within a normal LTE carrier, or in the unused resource blocks within a LTE carrier's guard-band—or "standalone" for deployments in dedicated spectrum.

The embodiments may be also applicable to device-to-device (D2D), machine-to-machine, peer-to-peer (P2P) communications. The embodiments may be also applicable to vehicle-to-vehicle (V2V), vehicle-to-infrastructure (V2I), infrastructure-to-vehicle (I2V), or in general to V2X or X2V communications.

The embodiments may be also applicable to wireless and communications systems beyond 5G, e.g., 5G Advance and 6G.

FIG. 1 illustrates an example of a communication system to which embodiments of the invention may be applied. The system may comprise a control node 110 providing one or more cells, such as cell 100, and a control node 112 providing one or more other cells, such as cell 102. Each cell may be, e.g., a macro cell, a micro cell, femto, or a pico cell, for example. In another point of view, the cell may define a coverage area or a service area of the corresponding access node. The control node 110, 112 may be an evolved Node B (eNB) as in the LTE and LTE-A, ng-eNB as in eLTE, gNB of 5G, or any other apparatus capable of controlling radio communication and managing radio resources within a cell. The control node 110, 112 may be called a base station, network node, or an access node.

The system may be a cellular communication system composed of a radio access network of access nodes, each controlling a respective cell or cells. The access node 110 may provide user equipment (UE) 120 (one or more UEs) with wireless access to other networks such as the Internet. The wireless access may comprise downlink (DL) communication from the control node to the UE 120 and uplink (UL) communication from the UE 120 to the control node.

Additionally, although not shown, one or more local area access nodes may be arranged such that a cell provided by the local area access node at least partially overlaps the cell of the access node 110 and/or 112. The local area access node may provide wireless access within a sub-cell. Examples of the sub-cell may include a micro, pico and/or femto cell. Typically, the sub-cell provides a hot spot within a macro cell. The operation of the local area access node may be controlled by an access node under whose control area the sub-cell is provided. In general, the control node for the small cell may be likewise called a base station, network node, or an access node.

There may be a plurality of UEs 120, 122 in the system. Each of them may be served by the same or by different control nodes 110, 112. The UEs 120, 122 may communicate with each other, in case D2D communication interface is established between them.

The term "terminal device" or "UE" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

In the case of multiple access nodes in the communication network, the access nodes may be connected to each other with an interface. LTE specifications call such an interface as X2 interface. For IEEE 802.11 network (i.e. wireless local area network, WLAN, WiFi), a similar interface Xw may be provided between access points. An interface between an eLTE access point and a 5G access point, or between two 5G access points may be called Xn. Other communication methods between the access nodes may also be possible. The access nodes 110 and 112 may be further connected via another interface to a core network 116 of the cellular communication system. The LTE specifications specify the core network as an evolved packet core (EPC), and the core network may comprise a mobility management entity (MME) and a gateway node. The MME may handle mobility of terminal devices in a tracking area encompassing a plurality of cells and handle signalling connections between the terminal devices and the core network. The gateway node may handle data routing in the core network and to/from the terminal devices. The 5G specifications specify the core network as a 5G core (5GC), and there the core network may comprise e.g. an access and mobility management function (AMF) and a user plane function/gateway (UPF), to mention only a few. The AMF may handle termination of non-access stratum (NAS) signalling, NAS ciphering & integrity protection, registration management, connection management, mobility management, access authentication and authorization, security context management. The UPF node may support packet routing & forwarding, packet inspection and QoS handling, for example.

As said, handovers (also known as handoffs) are commonly used for mobility control. In a handover, the UE moves from one cell's coverage area to another cell's coverage area. For example, the UE 120 may move from cell 100 covered by the gNB 110 (source node) to cell 102 covered by the gNB 112 (target node). During a handover, an ongoing call or data session (a.k.a. a first data session) is transferred from one channel connected to the core network to another channel (a.k.a. a second data session).

Random access (RA) processes may be used by the UE to connect to the target cell during a handover. Let us briefly take a look at a common RA process shown in FIG. 2 between the UE 120 and the gNB 110. Although applicable to many networks, we will in the following examples focus mainly on 5G (NR), for the sake of simplicity.

In a contention based random access (CBRA) process, showed in FIG. 2, the UE 120 selects one of available physical random access channel (PRACH) preambles out of maximum (e.g. 64) available preambles based on a selected synchronization signal block (SSB) beam index in beam sweeping procedure and sends it to gNB using a specific time and frequency resource known as random access-occasion (RO) in a message (Msg) 1 to the gNB 110. The UE 120 also needs to provide identity to the network so that network can address it in next step. The identity which the UE will use is called RA-RNTI (random access radio network temporary identity).

In the next step, the gNB 110 detects the preamble, calculates both the temporary C-RNTI associated to the RO over which the preamble has been received and a timing advance, and sends a PUSCH uplink grant to the UE. This is called a random access-response (RAR), which is sent as Msg2 addressed to UE 120 with the relevant RA-RNTI. Msg2 may by default carry the following information: temporary C-RNTI, which is another identity given to the UE 120; timing advance value, which provides means for the UE to compensate for the roundtrip delay caused by UE's distance from the gNB 110; and an UL grant resource, which is assigned as an initial resource to UE so that it can use a physical uplink shared channel (PUSCH).

Then, by using the uplink shared channel, the UE 120 sends Msg3 to the network over the scheduled uplink resource on PUSCH. This Msg3 may be called "RRC connection request message". In case of handover, this Msg3 can be "RRC reconfiguration complete". At this point the UE 110 is identified by the temporary C-RNTI.

Thereafter, the gNB may send Msg4 to the UE for contention resolution. After the RRC connection request of Msg3 is processed, a RRC response will be sent by gNB 110 to the UE 120. In an embodiment, although not shown, the RRC message (e.g. the RRC Response+Setup message) may be multiplexed with the Msg4 (i.e. sent with the MAC contention resolution control element, CE). In some examples, the CBRA procedure may also be used when the UE is in CONNECTED state. In that case, the Msg3 may contain a valid UE identity (C-RNTI) which identifies the UE and the gNB may respond to the UE in Msg4 directly with the C-RNTI.

With the contention based-RA process, there is some possibility that multiple UEs send PRACH with identical signatures. This may mean the same PRACH preamble from multiple UEs reaches the network (e.g. gNB) at the same time. Due to such overlap/collision, the RACH process for one or more of the UEs simultaneously attempting the RACH process with the same preamble may fail. Due to this, the network may need to rely on the contention resolution of Msg4. The UEs that have lost the contention, i.e., collision due to selecting the same preambles from different UEs at the same time, may repeat the RA procedure However, there is another possibility to avoid collisions. In an embodiment, there are dedicated preambles for the UE to use. The network may have informed the UE which preamble signatures it should use. This kind of RACH process is called the contention free random access (CFRA) procedure. In such case, the UE sends a dedicated preamble (after selecting one from a pool of dedicated preambles) and the network responds with random access response (RAR, see Msg2 above). The contention free RA process may ensure that there are no two UEs using the same preamble at the same time, thus avoiding collisions and contention resolution. The CFRA is within the scope of the application, although the description is written from the point of view of the CBRA. For example, when referring to Msg1 transmission in CBRA below when explaining some of the embodiments, the Msg1 could be Msg1 of CFRA.

There are different types of handovers. One is so-called dual active protocol stack (DAPS) handover. The DAPS solution has been introduced in 3GPP Rel. 16 to achieve 0 ms interruption time in DL and close to 0 ms in UL. DAPS may provide the advantage that the source link is not released before the target link is setup, thereby reducing HO failures and/or data losses.

Figure 3:
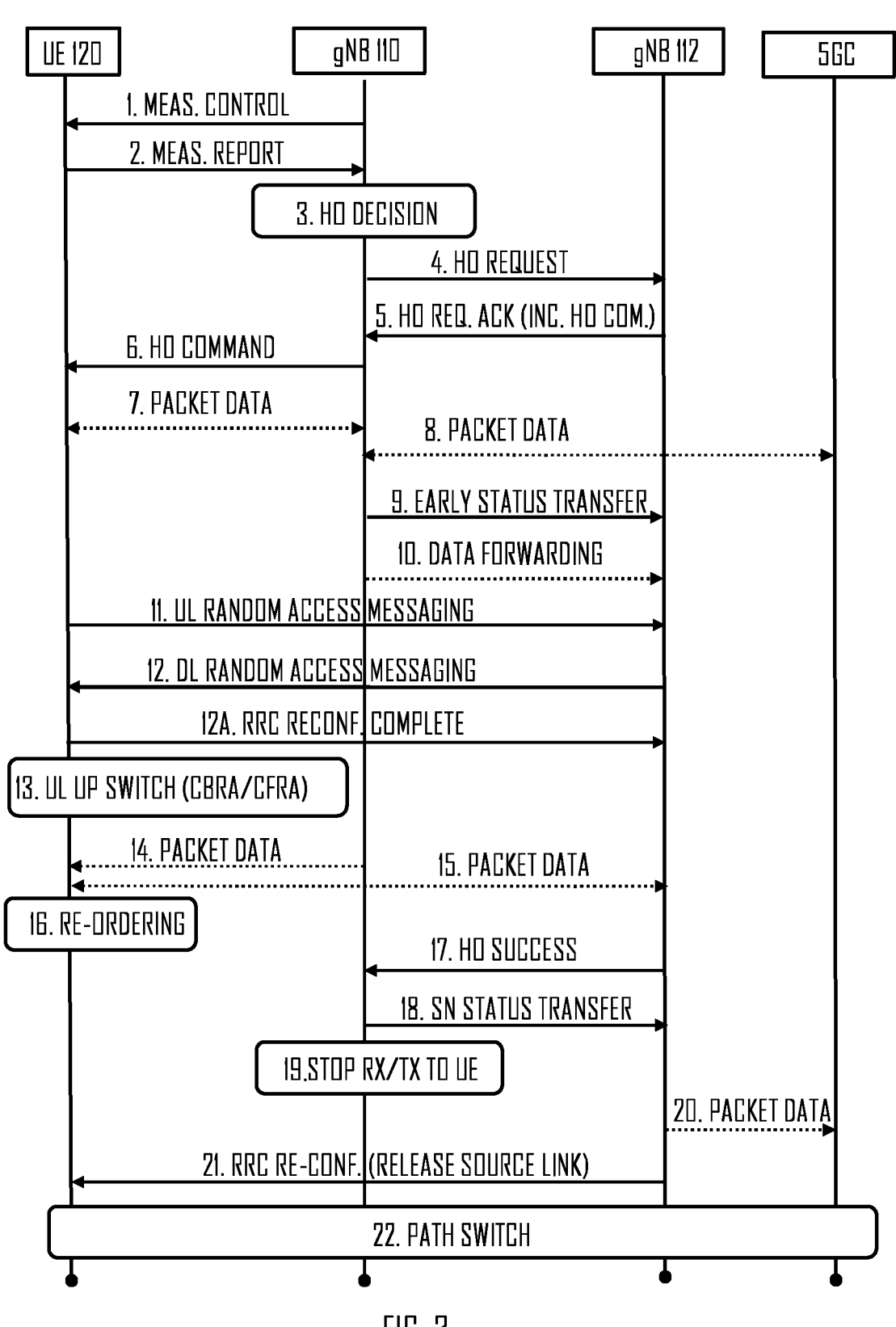
FIG. 3 shows DAPS handover, according to an embodiment.

FIG. 3 shows an example signaling flow diagram for DAPS handover. In DAPS, each of the source and target cells may have a layer 2 (L2) protocol stack with own security key for ciphering and deciphering of the PDCP SDUs. To avoid a hard handover causing service interruption, the UE with DAPS capability can establish a new radio link with respect to the target cell 102 before detaching the radio link of the source cell 100. That is, for some time before releasing the source cell 100, the UE 120 would be exchanging data with both source and target nodes 100, 102. For example, the UE can exchange data on the first data session (i.e. on a first data radio bearer, DRB) with the source cell and on the second data session (on a second DRB) with the target node. The sessions may comprise exchanging data for the same application or for different applications.

All of the steps of FIG. 3 are not discussed in detail here. For example, steps 1 to 6 are similar to baseline handover of NR Rel. 15, and known to a person skilled in the art. After receiving a handover command in step 6, the UE 120 continues exchanging user data with source cell 100 (i.e. with the source node 110) in step 7, even after having sent a RACH preamble to the target cell 102 (i.e. to the target node 100) during step 11. The received data may be ciphered by the key of the source cell 100.

When the UE 120 completes the random access successfully to the target cell (e.g. UE receives a random access response (RAR) in case of CFRA, or a PDCCH addressed to the C-RNTI in case of CBRA) during step 12 (see e.g. FIG. 2 and description above about RA processes), the UE 120 sends RRC reconfiguration complete in step 12A. Then UE performs uplink user plane switch in step 13 and may start communicating with the target cell, as shown in step 15. For CFRA, the UE may perform UL UP switch (sending new PDCP SDU or re-transmitting the PDCP PDUs which have not been acknowledged by source PDCP) after the RACH response is received. As for CBRA, it may be performed after the UE sends the RRC Reconfiguration Complete and the UE receives MAC CE for contention resolution.

Step 13 shows that the UE 120 switches UL user plane connection from source to target cell in step 13. However, it is possible that some transmissions towards the source cell (e.g. HARQ and RLC retransmissions, HARQ feedback, RLC/PDCP status report, CSI measurements, etc.) are still continued in step 14 (although Figure shows unidirectional DL arrow). That is, although not shown, the UE can still (but is not mandated to) communicate with the source (higher layer signaling and/or data, e.g. UL MAC and RLC re-transmissions), as the UE is equipped with dual protocol stacks. In this embodiment of FIG. 2, after completing the access to the target cell in steps 11-12, the UE receives DL user data with source and target cells in steps 14 and 15, that are ciphered with different security keys, but transmits uplink user data, i.e., new PDCP SDUs or PDCP PDUs that have not been acknowledged by source node, to the target node. The UE applies the security keys of the target cell for UL transmission on PUSCH.

After having established the new radio link with the target cell (e.g. second data session), the target node 112 sends in step 17 a Handover Success—indication to the source cell which in turn provides the final SN Status Transfer—message to the target cell in step 18. The source node can stop reception/transmission (RX/TX) from/to the UE in step 19. Upon receiving final "SN Status Transfer", the target cell can in step 20 start forwarding the buffered UL packets received from the UE to 5GC/UPF (i.e., serving gateway). In step 21, the target cell sends an explicit message for the UE to release the source link (e.g. the first data session). Thereafter a path switch is performed in step 22, which completes the handover.

Let us then consider another feature that is nowadays commonly used in wireless networks. Network slicing is a 5G feature to support different services using the same underlying mobile network infrastructure. In other words, network slicing may be seen as a network architecture that enables the multiplexing of virtualized and independent logical networks on the same physical network infrastructure. Each network slice can be considered as an isolated end-to-end network tailored to fulfil diverse requirements requested by a particular application. Network slices can differ, e.g., either in their service requirements like Ultra-Reliable Low Latency Communication (URLLC) and enhanced Mobile Broadband (eMBB) or the tenant that provides those services. A network slice is uniquely identified via the S-NSSAI (Single-Network Slice Selection Assistance Information). As shown in Table 1, an example of S-NSSAI may include both Slice Service Type (SST) and Slice Differentiator (SD) field with a total length of 32 bits or include only SST field part in which case the length of S-NSSAI is 8 bits only. The SST field may have standardized and non-standardized values. Values 0 to 127 belong to the standardized SST range. For instance, SST value of 1 may indicate that the slice is suitable for handling of 5G eMBB, 2 for handling of URLLC, etc. SD is operator-defined.

TABLE 1

| Format of S-NSSAI | |
| --- | --- |
| SST | SD |
| 8 bits | 24 bits |

As a nonlimiting example, UE is allowed to be simultaneously connected and served by at most eight slices, i.e., the UE can be associated with eight S-NSSAIs. On the other hand, each cell may support tens or even hundreds of slices, e.g., a tracking area can have a support up to 1024 network slices. As a nonlimiting example, a registration area (RA) is a list of Tracking Areas (TAs) that support the same slices from a UE perspective. A TA can comprise a group of neighbor cells or gNBs. Such grouping of gNBs may be performed at the initial deployment of the network and each gNB may be configured with its own TA(s). When a UE registers to a network it can indicate the slices to which it might need access (requested S-NSSAIs). The core network analyses the UE profile and subscription data to verify the list of slices the UE can really have access to. As a result, core network sends a list of "allowed slices" (allowed NSSAI) to the UE. The list of allowed slices could be different or only a subset of the requested slices from the UE request in registration process. The reason could be that the UE does not have access to a specific slice or the slice is not supported in the current location (TA) in which the registration request was initiated. If the allowed slices contain at least one slice then the core network also configures a "Registration Area" for that UE. This registration area contains a list of TAs in which all the allowed slices of the UE are supported. Core network knows the current TA of the UE from registration request and knows the slice support of the neighbouring TAs. Based on this information the core network can configure the list of TAs for the UE in which the slice support is homogenous for the requesting UE. Once the UE goes outside of the TAs in the Registration Area, it needs to perform a Registration Area Update, aka mobility registration update, and the core network re-evaluates the UE requested slices to configure a new registration area.

One of the identified issues in the 3GPP RAN Slicing Study Item (SI) is that some of the enterprise/industrial scenarios have the requirement for service continuity in case the slice does not exist in the neighbouring cells and the UE moves to those neighbouring cells. In order to provide service continuity, UE should not have interruption in any of the on-going PDU sessions.

There may be situations where, as shown by FIG. 4, the UE 120 is moving towards an area that does not support at least one of UE's ongoing slices (i.e. slice 1 in this example). In FIG. 4 it is assumed that the source node 110 supports slice 1, but the target node 112 does not. However, node 112 supports slice 2. The target NG-RAN node 112 fails to accept the PDU session with at least one of the ongoing S-NSSAIs (slice 1). Under such circumstance, the service(s) for failed ongoing slice(s) is/are interrupted for the UE. As identified by one of the objectives in the RAN Slicing SI, there is an urge to attain slice service continuity for certain slices, e.g., in enterprise/industry scenarios, even though the target does not support the ongoing slices of the UE. In some other example scenarios, where the presented embodiments herein can be applied, UE's ongoing slice(s) may be supported by the target NG-RAN node 11; but are, e.g., overloaded and thus may not accept new UEs or the associated data session(s). That is, the presented embodiments can be applied to slice remapping cases, where the slice remapping decision can be based on different reasons, e.g., slice is not supported, or slice is overloaded.

Figure 5:
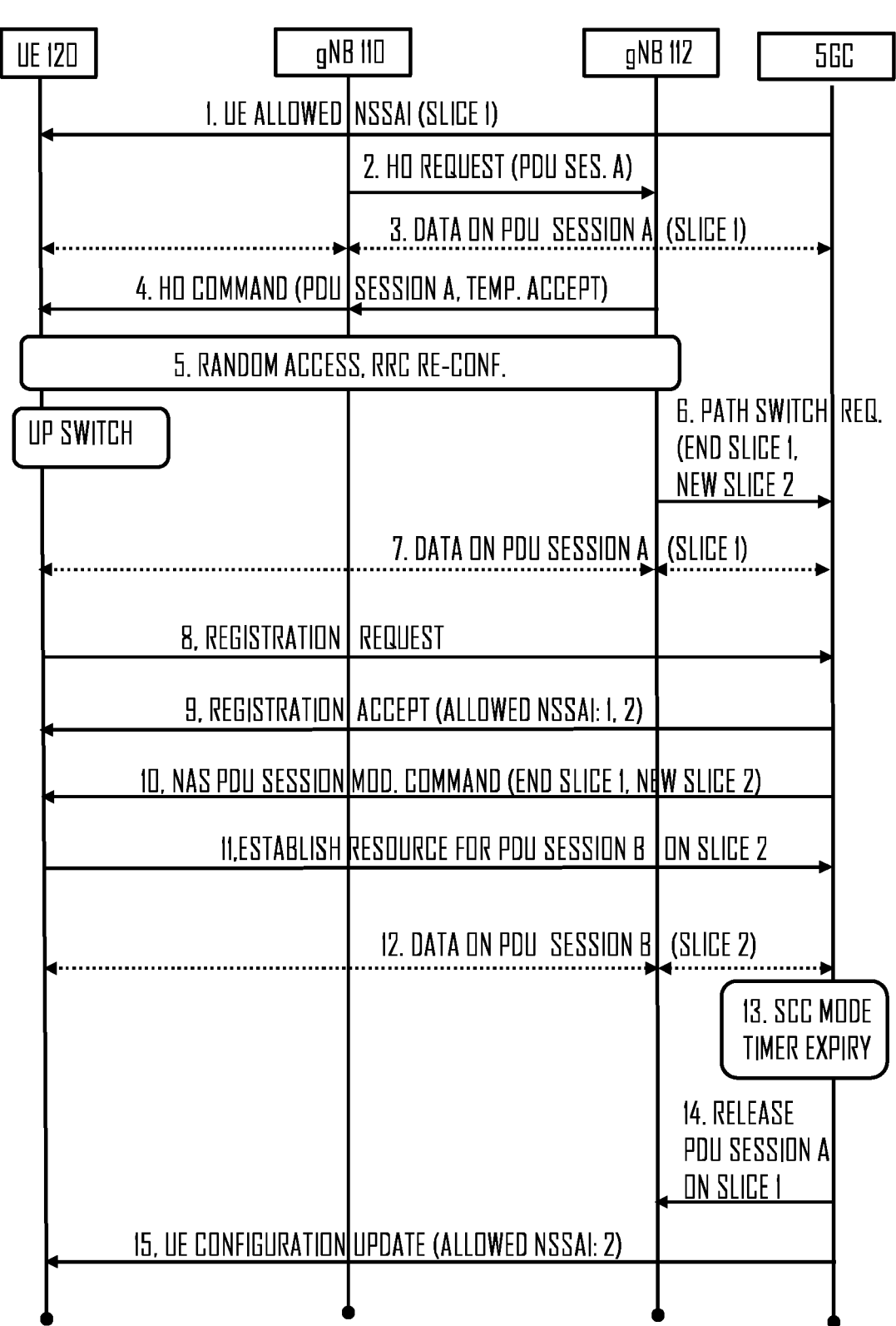
FIG. 5 depicts a handover suitable for slice remapping, according to an embodiment.

One of the solutions proposed to solve the service continuity problem is shown in FIG. 5 as 5GC-based solution based on session service continuity (SSC) mode 3. It is described, e.g., in section 6.2.1.2.1.4 of TR 38.832 V1.0.0, and not explained in detail here. In this solution, the UE needs to do a normal/baseline handover, and it initiates a new PDU session (e.g. the second data session) at the target. The UE typically then experiences an interruption time during the handover execution time and until the slice mapping/remapping is completed and the new PDU session is established at the target, i.e. from step 4 to step 7 (where UE communicates with target) in FIG. 5. This is because in FIG. 5 the UE is not equipped with DAPS and there is interruption when switching from source link (step 3) to target link (step 7). That is, the connection to the source cell is released at step 4 ("HO command"). Then, the UE makes RA process in step 5 with the target and continues the transmissions/reception after the handover execution is completed, as shown with the block "UP SWITCH" in FIG. 5. In other words, there is a "Start of UP Interruption during HO" from step 4 (since source cell will stop sending data to the UE after step 4) until step 5 which reflects the "End of UP Interruption during HO". The interruption time during handover execution plus the PDU session establishment can reach several hundreds of milliseconds. Such an interruption time may not be acceptable for high availability slices, e.g., in certain target scenarios of enterprise/industry. Furthermore, this may imply abnormal slice usage at the target node 112, because the target node does not support slice 1, yet it temporarily sets up a data session on slice 1 (shown in step 7). Session B in step 12 of FIG. 5 is then on the supported slice 2. At this point the temporary support of slice 1 at the target can stop, as shown with step 14.

In FIG. 5, the UE performs a post-handover registration (as source and target nodes have different slice support, they do not belong to the same registration area for the UE). Because 5GC received (end slice 1) at step 6, the 5GC still includes the slice 1 in the Allowed NSSAI towards the UE in step 9 (the slice is indeed still temporarily available until the UE receives from 5GC notification of the final release of PDU session on slice 1). At the expiry of SSC mode 3 timer in step 13, the 5GC triggers the release of the PDU session of slice 1 according to SSC mode 3 procedures. The 5GC sends a final UE Configuration Update message in order to update the Allowed NSSAI towards the RAN and the UE in step 15. In this example, the new Allowed NSSAI is slice 2.

As shown above, there are some options (e.g. SSC3 handover of FIG. 5) when non-support of a slice at the target cell is present in connection of the handover. However, this may be deemed as not an optimal solution. In SSC3 handover, when the slice is not supported at the target, the target user plane communication is still set up as early as possible (i.e. after RACH), while temporarily utilising slice usage at the target cell, although not supported.

It is to be further noted that in normal DAPS of FIG. 3 with a slice support at the target, the target link for use data is likewise set up as early as possible. DAPS has not been discussed before in connection of the possibility that the target cell does not support the slice on which the UE 120 communicates with the source cell. Considering the target scenario illustrated in FIG. 4, using DAPS without adaptation would fail here because the DRB of the source side belongs to PDU session of slice 1 which is not supported at target and therefore this DRB of slice 1 cannot be setup at target side.

How the DAPS capable UE 120 should behave when the slice is not necessarily supported at the target cell is an open issue. A straight-forward combination of DAPS and SSC3 would also not provide an ideal solution, because the UE would do the UL switch to the target as soon as possible, and this would require the temporary (may be considered as abnormal) support of otherwise-not-supported-slice from the target.

To at least partially improve a handover in a scenario as depicted in FIG. 4, there is proposed a solution to minimize the interruption gap and data loss during the slice remapping scenario in the case where the original slice is not supported at the target, by using an evolution of DAPS handover without making abnormal usage of original slice at the target side.

FIG. 6 depicts an example method. The method may be performed by a user equipment, such as the UE 120 for example. Accordingly, as shown in FIG. 6, the UE 120 in step 600 communicates a first data session (e.g. session A on first DRB) on a first network slice (e.g. slice 1) with a source network node, such as with the node 110. This data session may comprise exchange of data in DL and/or UL between the UE 120 and the network node 110. The data may relate to certain application or applications being run at the UE, for example.

As depicted in FIG. 4, in the targeted scenario the UE 120 is to be handed to a target cell, e.g. cell 102 controlled by gNB 110. The handover from the source network node 110 to the target network node 112 is assumed to be an evolution of a dual active protocol stack (DAPS) handover enabling the UE 120 to communicate with the source network node 110 and with the target network node 112 during the execution of the handover, as shown e.g. in FIG. 3. Accordingly, the UE 110 is equipped with DAPS.

In step 602, the UE receives an indication (e.g. within a handover command) from the source node 110, although the command may be initiated by the target node 112 and sent via the source node 110. The command indicates whether or not mapping the first data session to a second data session (to a second DRB) at a target network node requires switching to a second network slice, different from the first network slice. In other words, it may be that the first slice is not supported at the target node 112 or may be, e.g., overloaded. In such a case, slice remapping may be needed from slice 1 to slice 2, assuming slice 2 is supported at the target node 112. In case the slice 1 is supported at the target node 112, then slice remapping may not be needed but the data session can be carried out on the same slice. In other words, a PDU session on the source cell, called the first data session is mapped to the second data session on the target cell. When the target supports the slice of the first data session, the second data session can be set up on the same slice as the first data session, and there is no need for the slice remapping. However, if the target does not support the slice of the first data session or, even when the target supports the first slice but the first slice is overloaded, the second data session may be set up on another (second) slice at the target node, which requires slice remapping. This affects the way the UE 120 is to operate during the DAPS handover, as will be described.

As the UE 120 is DAPS capable, the UE 120 in step 604 decides to continue the first data session on the first network slice with the source network node during the handover process. This may help in avoiding data losses and reduces interruption time.

In step 606, the UE 120 decides, based on the indication, when to start user plane data communication on the second data session with the target network node. Indeed, whether remapping of the slice is needed at the target affects the time point when the UE starts communicating data with the target cell. It is noted that user plane data communication on different slices with the target may possibly be triggered at different times. However, the user data communication referred here means the data (associated to the application/ service or applications/services) that has been exchanged on the first data session with the source cell and will be continued on the second data session with the target cell. Without such indication included in the HO command, or received separately, the UE would automatically switch the UP connection to the target link, as the UE is DAPS capable.

In an embodiment, the UE may also receive an indication that slice remapping is needed, and that the temporary abnormal slice usage is acceptable. In such case, the UE 120 may continue as shown in FIG. 5. In case slice remapping is needed but not possible at the target node, the HO command may reject the HO request. In an embodiment, where the UE requires a slice that cannot be supported by the target or a slice is overloaded, the UE receives, e.g. in the handover command or in some other message, which slices are supported by the target. This may enable the UE to proceed in remedial actions, such as changing service characteristics so that one of the slices supported by the target does provide adequate QoS for the UE's needs. The UE may inform this to the source node and the source node may send another HO request to the target node, for example.

In an embodiment shown with step 608 in FIG. 6, the UE 120 determines, based on the indication, that mapping the first data session to the second data session at a target network node does not require switching to the second network slice. In this case it can be assumed that the target node supports the slice 1 on which the UE currently communicates with the source node. Then, the UE decides to start user plane data communication on the second data session with the target network node upon completion of a random access process with the target network node. This resembles the DAPS solution of FIG. 3, but it is noted that here the UE actively makes the decision based on an indication that is not present in FIG. 3. In FIG. 3, the decision to trigger the target link is automatic because the UE is DAPS capable. When triggering the communication with the target before releasing the source link, the UE can communicate on the first network slice with both the source network node and with the target network node during the handover process. When the second data session is ongoing with the target, the UE 120 may release the first data session with the source network node, as explained in connection of FIG. 3.

When the target node does not support the slice 1 on which the UE currently communicates with the source node, block 610 in FIG. 6 is carried out. There, the UE 120 determines, based on the indication received in the handover command (or otherwise), that mapping the first data session to the second data session at the target network node requires switching to the second network slice. As a response thereto, the UE 120 may decide to communicate with the source network node on the first data session on the first network slice during the handover process, and start user plane data communication on the second data session on the second network slice with the target network node only after the mapping to the second data session on the second network slice at the target network node has been setup. That is, unlike in DAPS or SSC3 solutions, the UE 120 defers the UP communication start with the target, in order to avoid abnormal slice usage at the target. The postponing/deferring means that the UE does not start data communication with the target node right after RACH process is completed, but only after the second slice and corresponding second data session on that slice has been set up by the target node.

Therefore, in the case of step 610, the UE may assume that the target network node does not support the first network slice. Unlike in SSC3, it is proposed that the UE 120 then avoids communicating with the target network node on the first network slice. This beneficially avoids the abnormal slice usage (i.e. the temporary provision of a non-supported slice) of the target.

In an embodiment, starting the user plane communication with the target network node comprises switching from the first data session on the first network slice at the source network node to the second data session on the second network slice at the target network node. In other words, the PDU session is released at the source substantially at the time when the second data session has been set up at the target. This may simplify the DAPS architecture. Typically, in DAPS handover, the UE receives packets from source cell and target cell, and the packets are re-ordered by a common PDCP layer at the UE. Now, as the first and second data session are on different slices, it may not be possible to perform re-ordering of the packets received from slice 1 of the source cell and slice 2 of the target cell.

However, in case of having a different PDCP architecture for the DAPS, starting the user plane communication with the target network node comprises releasing the first data session on the first network slice with the source network node only after the second data session on the second network slice with the target network node is ongoing. That is, there may be simultaneous communication of user data on the first slice with the source node and on the second slice with the target node. This may reduce the interruption time resulting from establishing the second data session on the second network slice, for example.

In an embodiment, starting the user plane communication with the target network node comprises starting to communicate user plane data with the target network node in uplink and/or downlink directions. In an embodiment, starting the user plane communication with the target network node comprises at least the UE deferring the uplink switch and the transmission of uplink user plane with the target network node until the second data session on a second network slice is established.

FIG. 7 shows an embodiment performed by a source network node, such as the gNB 110.

In step 700, the source node sends a handover request of/for a UE (e.g. UE 120) to a target network node (such as to the node 112), wherein the request indicates that the first data session between the source network node and the user equipment is on the first network slice. The HO request can be called a DAPS remapping request. The request may thus indicate that the user equipment is equipped with the DAPS enabling the user equipment to communicate with the source network node and with the target network node during the handover process. The request may indicate that the UE has DAPS remapping handover function capability, e.g. that the UE is DAPS capable and slice remapping capable. The DAPS remapping capability may be defined as DAPS capability modified with the ability to start the user plane communication on the second data session on the second network slice with the target network node only after the second data session on the second network slice at the target network node has been setup. When slice remapping is needed, this functionality may be used. This enables target gNB to decide a proper HO accept: e.g. in this case of DAPS remapping support, to accept DAPS remapping request for a non-supported slice or for an overloaded slice, and also to build a proper radio configuration, e.g. in this case only include the DRB at source and not at the target in the HO command. The source node may have received from the UE a capability message indicating such DAPS remapping handover capability, for example.

In some embodiments the source node knows which slices the target node supports, and the HO Request may rather request whether the slice remapping is possible. Implicitly such message would still indicate to the target that the first data session is on the first network slice. In some other embodiments, the source node 110 is not aware of target node's slice supports. It is noted that the indication may be a separate IE or message from the HO request but sent substantially in connection of the HO request.

In step 702, the source node 110 receives a response, such as a HO command or another message, from the target network node, the response indicating whether mapping the first data session to the second data session at the target network node requires switching to the second network slice, and/or whether the slice remapping is possible.

In step 704, the source node 110 sends a message (e.g. RRC Reconfiguration containing the handover command) to the UE 120 indicating whether mapping the first data session to the second data session at the target network node requires switching to the second network slice during the handover.

In an embodiment, the HO command from the target comprises the indication whether mapping the first data session to the second data session at the target network node requires switching to the second network slice, and/or whether the slice remapping is possible. Then the source node relays/forwards the HO command to the UE as part of or as the message of step 704. In this manner, the UE becomes aware about the slice remapping needs.

In an embodiment, the source node 110 determines, based on the response from the target network node, that mapping the first data session to the second data session at the target network node requires switching to the second network slice. As a response, the source node 110 includes, as the indication in the message of step 704, e.g. in a RRC Reconfiguration message containing the handover command generated by the target node, information (e.g. an information element) that mapping the first data session to the second data session at the target network node requires switching to the second network slice during the handover. This indication configures the UE to 1) start user plane data communication on the second data session with the target network node only after the mapping to the second network slice (i.e. slice remapping) at the target network node is completed, and 2) avoid communicating with the target network node on the first network slice. However, since the UE is DAPS capable, the source 110 may continue the first data session on the first network slice with the user equipment during the execution of the handover at least until the setup of the second data session on the second network slice at the target network node is completed, e.g. until the mapping to the second network slice at the target network node is completed.

FIG. 8 shows an embodiment performed by a target network node, such as the gNB 112.

In step 800, the target node 112 receives a handover request of a UE (such as the UE 120) from a source network node (such as the node 110), wherein the request indicates that the first data session between the source network node and the user equipment is on the first network slice, and that the UE is DAPS remapping capable. The request may indicate that the UE has DAPS remapping function capability, e.g. that the UE is DAPS capable and slice remapping capable, as explained above. This enables target gNB to decide a proper HO accept: e.g. in this case of DAPS remapping support, to accept DAPS remapping request for non-supported slice or overloaded slice, and also to build a proper radio configuration, e.g. in this case only include the DRB at source and not at the target in the HO command.

In step 802, the gNB 112 determines whether the target network node 112 supports the first network slice. In addition or alternatively, the gNB 112 may determine whether the first network slice is overloaded or not. In step 804 the gNB 112 transmits a response to the source network node 110, the response indicating whether or not mapping the first data session to the second data session at the target network node during the handover requires switching to the second network slice. In other words, the indication in the response (such as HO command) indicates that maintaining service continuity at the target requires switching/mapping the first slice to the second slice, and migrating the first data session to the second data session at the target network node during the handover. The response may be a HO command, which the source then forwards/relays to the UE. In another embodiment, the response may be another message than HO command.

In an embodiment where slice remapping is needed (i.e. first slice is not supported or is overloaded), the target node may build the response (e.g. HO command) towards the user equipment. Because the target knows the HO request is for DAPS remapping function from step 800, the target gNB may build a proper radio configuration in the HO command, i.e. only include the DRB at source and not at the target in the HO command. Consequently, the target node can include, as the indication in the response, information that mapping the first data session to the second data session at the target network node requires switching to the second network slice during the handover. This response (e.g. HO command) may then configure the user equipment to start user plane data communication on the second data session with the target network node only after the setup of the second data session on the second network slice at the target network node is completed, and avoid communicating with the target network node on the first network slice.

In an embodiment, the target node 110 may beneficially avoid communicating with the user equipment on the first network slice when the first network slice is not supported at the target node 110, and start user plane data communication on the second data session with the user equipment only after the mapping to the second network slice at the target network node is completed.

Figure 9:
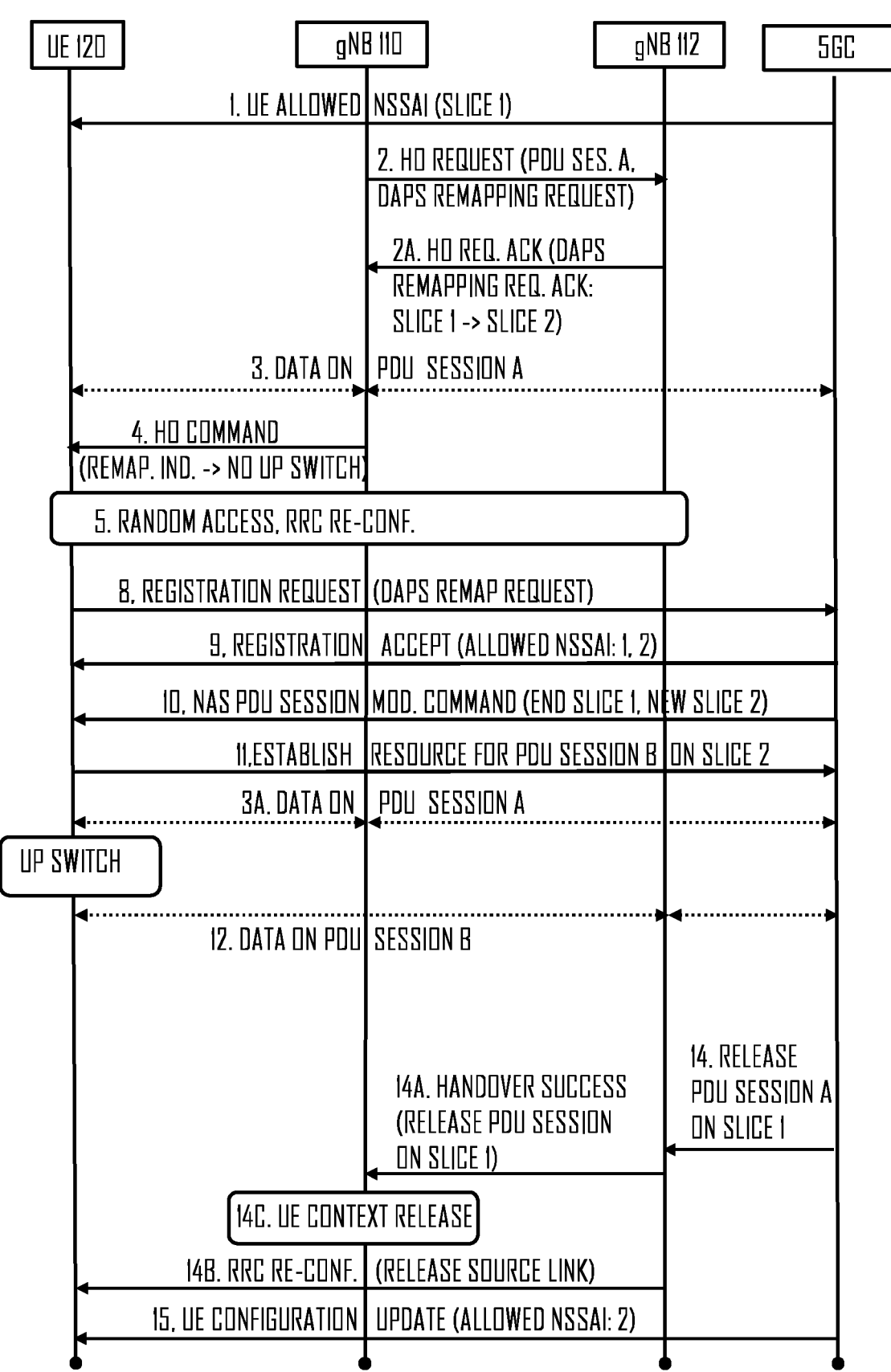
FIG. 9 shows a signaling flow diagram of a handover according to an embodiment.

Let us take a look at the proposal in a form of a signaling flow diagram of FIG. 9, which shows an embodiment where the target node 112 does not support the slice 1 in connection of DAPS (a.k.a. DAPS remapping handover). In step 1, the 5GC informs the UE 120 about allowed slices (here slices 1). It is assumed that the UE communicates with source node 110 on PDU session A (=first data session) on slice 1 (=first network slice).

Although not shown in the Figure, in an embodiment, the UE has signalled to the source network node a capability to support a DAPS remapping function. The DAPS remapping capability may be defined as DAPS capability modified with the ability to start the user plane communication on the second data session on the second network slice with the target network node only after the second data session on the second network slice at the target network node has been setup.

In step 2, the source node 110 sends a handover request to target cell. In an embodiment, the source node 110 is aware that there is no slice 1 support at target cell. This can be based on existing XnAP procedures. Because of this, the source node 110 in step 2 requests for DAPS re-mapping handover for PDU session A of slice 1. This may correspond to e.g. steps 700 and 800 of FIGS. 7 and 8.

In step 2A of FIG. 9, the target node 112, after having determined that slice remapping is possible (corresponding to step 802 of FIG. 8), acknowledges the DAPS re-mapping request. This may mean that the target node 112 declares that slice 1 is to be re-mapped to slice 2. Such indication can be included in the response and thus correspond to steps 702 and 804 of FIGS. 7 and 8, respectively.

In step 4, the source node 110 sends DAPS re-mapping handover command (which is prepared by the target node 112) to the UE 120. This corresponds to steps 602 and 704 of FIGS. 6 and 7, respectively. In this way, the UE 120 is made aware that PDU session of slice 1 will be re-mapped at the target node.

As a response to this, the UE decides to postpone communication with the target node 112 until the PDU session on the new slice is established at the target node. This may comprise, unlike in SSC3 solution, not making an UP switch to the target cell before the PDU session (i.e. the second data session) on the new slice is established at the target, thus avoiding abnormal slice usage at the target. The UE can continue the PDU session (the first data session) on/of slice 1 with the source cell as shown in steps 3 and 3A.

In step 5, the UE 120 synchronizes to the target cell via RACH process, including sending an RRC Reconfiguration Complete message to the target cell.

In step 8, the UE 120 sends a registration request to 5GC. This may be needed when the UE has moved to a new tracking area not supporting the slice 1. The UE may send an indication to the core network (e.g. 5GC) that slice remapping at the target network node is to be performed and that the apparatus comprises a dual active protocol stack or that the handover is a so-called DAPS remapping handover. This indication to the core network may be sent in a non-access stratum (NAS) register request message or in a next generation application protocol (NGAP) path switch request, for example.

In step 9, 5GC sends a registration accept where it allows slice 1 and slice 2, i.e. the first and second network slices are allowed for the UE. This may allow the UE to make use of slice 1 and slice 2 at the same time in the DAPS handover. It is noted that such messaging can be included in the response of step 9 if the 5GC is made aware of the DAPS re-mapping handover earlier in step 8.

In step 10, the 5GC sends a NAS configuration message to the UE, to inform the UE that the UE can initiate a new session on slice 2 at the target network node. In step 11, the UE establishes resources for the PDU session of slice 2. Thus, establishment (a.k.a. set up) of the second data session on the second network slice with the target network node may require core network involvement after completion of a random access process between the UE and the target network node.

Until this far, the DAPS handover has enabled the UE to continue the communication with the source node 110 on slice 1. Now, as the second data session on slice 2 is established, the UE may switch the user plane (UL and/or DL) from source to target and in step 12 start communicating user plane data on the second data session with the target cell on slice 2.

The UE can thus switch from the source DRB of PDU session of slice 1 to target DRB of PDU session of slice 2. As said earlier, in one embodiment this comprises at the same time releasing the data session with the source node. In another embodiment, depending on UE hardware, the UE may still continue the data session with the source on slice 1 for a period of time. In an embodiment, but not necessarily, this PDU session on the target cell may be created with a SSC mode 3 mechanism. The UE may keep the IP addresses of both UPFs, and both PDU sessions may be active at the same time.

The source link, at least the first data session with the source node, is released at latest in steps 14-14B of FIG. 9. This may be triggered by sending of a release message in step 14. The step 14A may comprise the target node sending the handover success message to the source node to release the UE context at the source node in step 14C. Alternatively, this can be a UE context release message, or the message 14 can be transmitted also to the source node (in such case message 14A may not be needed). In step 14B, the target node may also reconfigure the UE to release the source cell's link. Finally, in step 15, 5GC re-configures the allowed NSSAI list to the UE.

In one embodiment, the 5GC in step 9 informs the UE 120 that only slice 2 is allowed. I.e. slice 1 is, unlike shown in the Figure, not included in the allowed NSSAIs. This may be done because the UE in step 8 informs the 5GC of the DAPS remapping handover (e.g. indicates that slice remapping at the target network node is to be performed and that the apparatus comprises the dual active protocol stacks). Furthermore, in such case, step 15 may be omitted.

In an embodiment, the 5GC sends a release message (e.g. release PDU session A on slice 1) to the source cell already in connection of step 9. In such case, steps 14 and 14A may be omitted.

The proposed slice service continuity based on DAPS remapping may reduce interruption time, which may be beneficial. The proposed method may avoid abnormal use of the non-supported slice in the target. This may be accomplished e.g. by performing the following:

Execution of handover with slice-continuity DAPS configuration where the DRB is not setup at target side but kept at source side only. This enables continuous delivery over source DRB (data radio bearer) over the first data session, Special handling at the UE, which switches user plane from the old DRB/PDU session of slice 1 to the new DRB of new PDU session of slice 2 just before step 12 in FIG. 9. I.e. the UE's user plane switch is postponed, instead of performing it right after the random access is completed as in FIG. 5. E.g. in DAPS/SSC3, the UE performs the UL switch after the random access is successfully completed. In current solution, the UE is configured to delay the UL switch until the new PDU session is established in the target gNB. This is beneficial to avoid the UL interruption while setting up the new PDU session in target gNB.

Release of the source DRB is triggered by target node at step 14-14B, when receiving indication to release PDU session of slice 1 from 5GC.

In DAPS/SSC3 handover, the target gNB 110 provides a handover command setting up DRBs for receiving the data of slice 1. In FIG. 9 solution, this is not needed as the UE 120 can still get the data from the source gNB 110 and as such the target gNB will not set any DRBs (save resources) when generating the handover command (upon receiving the DAPS remapping indication from the source gNB).

Unlike in DAPS/SSC3, the source gNB 110 does not have to forward the packets of slice 1 to the target gNB, when the target node 112 acknowledges the DAPS re-mapping.

Compared to legacy non-DAPS handover and SSC3 handover, the following comparison table can be drawn:

| Cases | PDU session Interruption | Data Loss | Abnormal slice usage at target |
|---|---|---|---|
| Legacy handover (non-DAPS handover) | Yes: X1 (steps 4 to 11 of FIG. 5 except that the UE does not receive data on PDU Session A from the target node (as shown in step 7) but rather waits until PDU Session B is established) | Yes: Y packets from PDU Session A are lost while waiting for the PDU Session B to be set up. The packets of PDU Session A are not sent again by target node. | No |
| SSC mode 3 | Yes: X2 < X1 (steps 4 to 7 of FIG. 5) | No, as the packets of the PDU Session A are re-sent by the target node after the handover execution. | Yes |
| FIG. 9 solution | Between 0 and X1 | Between 0 and Y | No |

Figure 10:
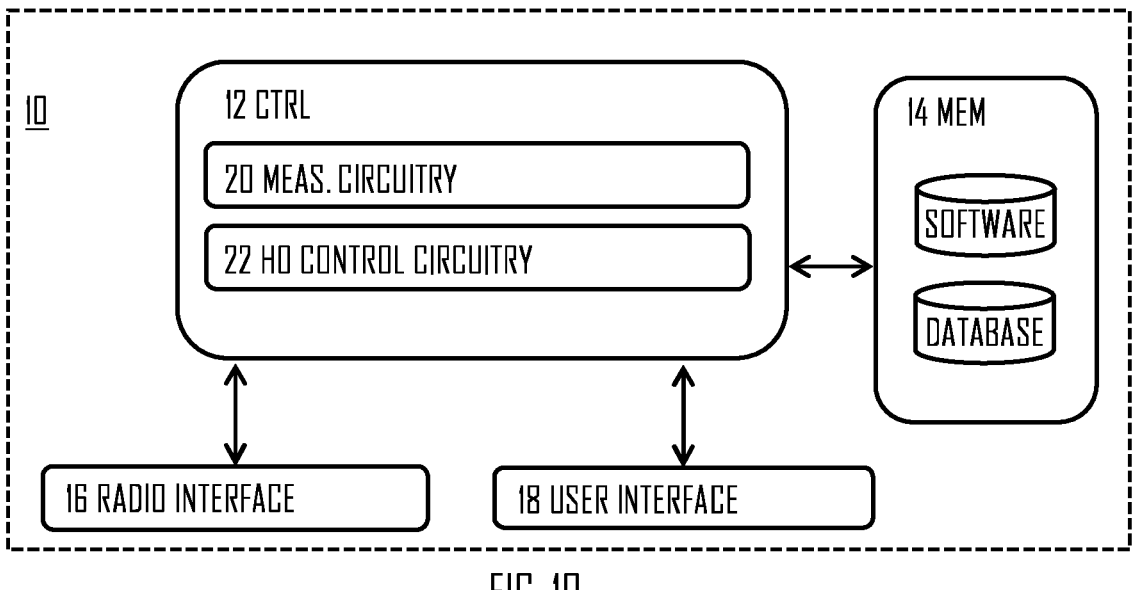
FIGS. 10-11 illustrate apparatuses, according to some embodiments.

An embodiment, as shown in FIG. 10, provides an apparatus 10 comprising a control circuitry (CTRL) 12, such as at least one processor, and at least one memory 14 including a computer program code (software), wherein the at least one memory and the computer program code (software), are configured, with the at least one processor, to cause the apparatus to carry out any one of the above-described processes. The memory may be implemented using any suitable data storage technology, such as semiconductor-based memory devices, flash memory, magnetic memory devices and systems, optical memory devices and systems, fixed memory and removable memory. The memory may comprise a database for storing data.

In an embodiment, the apparatus 10 may comprise the terminal device of a communication system, e.g. a user terminal (UT), a computer (PC), a laptop, a tabloid computer, a cellular phone, a mobile phone, a communicator, a smart phone, a palm computer, a mobile transportation apparatus (such as a car), a household appliance, or any other communication apparatus, commonly called as UE in the description. Alternatively, the apparatus is comprised in such a terminal device. Further, the apparatus may be or comprise a module (to be attached to the UE) providing connectivity, such as a plug-in unit, an "USB dongle", or any other kind of unit. The unit may be installed either inside the UE or attached to the UE with a connector or even wirelessly.

In an embodiment, the apparatus 10 is or is comprised in the UE 120. The apparatus may be caused to execute some of the functionalities of the above described processes, such as the steps of FIG. 6.

The apparatus may further comprise a radio interface (TRX) 16 comprising hardware and/or software for realizing communication connectivity according to one or more communication protocols. The TRX may provide the apparatus with communication capabilities to access the radio access network, for example.

The apparatus may also comprise a user interface 18 comprising, for example, at least one keypad, a microphone, a touch display, a display, a speaker, etc. The user interface may be used to control the apparatus by the user.

The control circuitry 12 may comprise a measurement circuitry 20 for performing handover related measurements, for example. The control circuitry 12 may further comprise a handover control circuitry 22 for controlling the handover related operations, such as when to start user plane communication with the target node, according to any of the embodiments.

Figure 11:
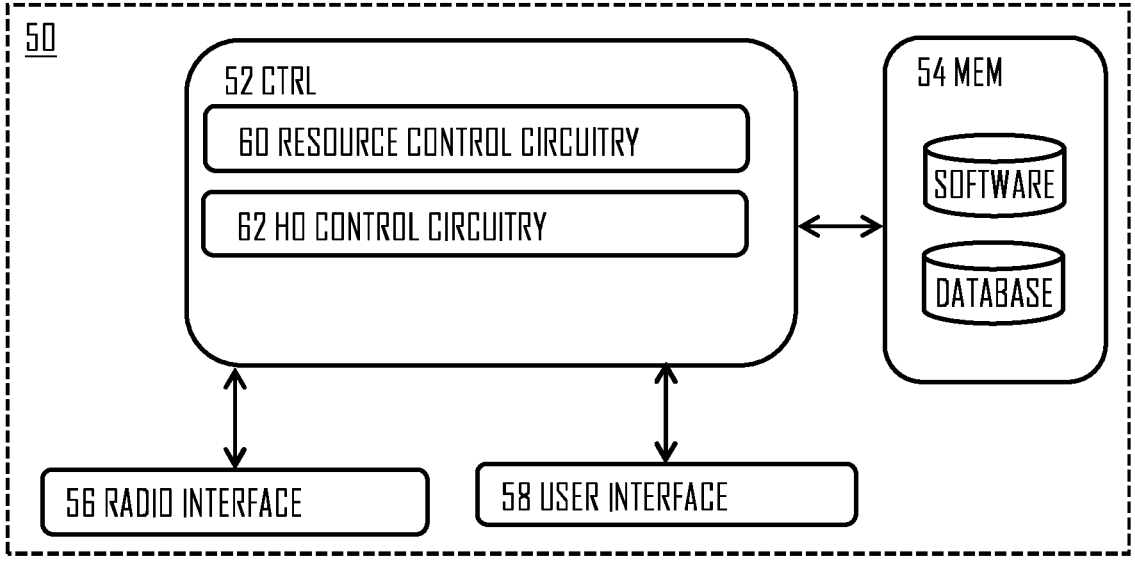

An embodiment, as shown in FIG. 11, provides an apparatus 50 comprising a control circuitry (CTRL) 52, such as at least one processor, and at least one memory 54 including a computer program code (software), wherein the at least one memory and the computer program code (software), are configured, with the at least one processor, to cause the apparatus to carry out any one of the above-described processes. The memory may be implemented using any suitable data storage technology, such as semiconductor-based memory devices, flash memory, magnetic memory devices and systems, optical memory devices and systems, fixed memory and removable memory. The memory may comprise a database for storing data.

In an embodiment, the apparatus 11 may be or be comprised in a network node, such as in gNB/gNB-CU/gNB-DU of 5G. In an embodiment, the apparatus is or is comprised in the network node 110 or in the network node 112. The apparatus may be caused to execute some of the functionalities of the above described processes, such as the steps of FIG. 7 or 8.

In an embodiment, a CU-DU (central unit-distributed unit) architecture is implemented. In such case the apparatus 50 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the radio node may be stand-alone apparatuses communicating with each other via a radio path or via a wired connection. Alternatively, they may be in a same entity communicating via a wired connection, etc. The edge cloud or edge cloud server may serve a plurality of radio nodes or a radio access networks. In an embodiment, at least some of the described processes may be performed by the central unit. In another embodiment, the apparatus may be instead comprised in the distributed unit, and at least some of the described processes may be performed by the distributed unit. In an embodiment, the execution of at least some of the functionalities of the apparatus 50 may be shared between two physically separate devices (DU and CU) forming one operational entity. Therefore, the apparatus may be seen to depict the operational entity comprising one or more physically separate devices for executing at least some of the described processes. In an embodiment, the apparatus controls the execution of the processes, regardless of the location of the apparatus and regardless of where the processes/functions are carried out.

The apparatus may further comprise communication interface (TRX) 56 comprising hardware and/or software for realizing communication connectivity according to one or more communication protocols. The TRX may provide the apparatus with communication capabilities to access the radio access net-work, for example. The apparatus may also comprise a user interface 58 comprising, for example, at least one keypad, a microphone, a touch display, a display, a speaker, etc. The user interface may be used to control the apparatus by the user.

The control circuitry 52 may comprise a resource control circuitry 60 for determining which resources are to be used in communication with the UE, according to any of the embodiments. The control circuitry 52 may comprise a handover control circuitry 62 e.g. for controlling handover related operations, according to any of the embodiments.

In an embodiment, an apparatus carrying out at least some of the embodiments described comprises at least one processor and at least one memory including a computer program code, wherein the at least one memory and the computer program code are configured, with the at least one processor, to cause the apparatus to carry out the functionalities according to any one of the embodiments described. According to an aspect, when the at least one processor executes the computer program code, the computer program code causes the apparatus to carry out the functionalities according to any one of the embodiments described. According to another embodiment, the apparatus carrying out at least some of the embodiments comprises the at least one processor and at least one memory including a computer program code, wherein the at least one processor and the computer program code perform at least some of the functionalities according to any one of the embodiments described. Accordingly, the at least one processor, the memory, and the computer program code form processing means for carrying out at least some of the embodiments described. According to yet another embodiment, the apparatus carrying out at least some of the embodiments comprises a circuitry including at least one processor and at least one memory including computer program code. When activated, the circuitry causes the apparatus to perform the at least some of the functionalities according to any one of the embodiments described.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus, comprising:

at least one processor and at least one memory including a computer program code, wherein the at least one memory and the computer program code are configured, with the at least one processor, to cause the apparatus to:

communicate a first data session on a first network slice with a source network node;

receive an indication indicating whether or not mapping the first data session to a second data session at a target network node requires switching to a second network slice, wherein the apparatus is equipped with a dual active protocol stack enabling the apparatus to communicate with the source network node and with the target network node during the handover process of the apparatus from a source cell provided by the source network node to a target cell provided by the target network node;

decide to continue the first data session on the first network slice with the source network node during the handover process; and decide, based on the indication, when to start user plane data communication on the second data session with the target network node.

2. The apparatus of claim 1, wherein the at least one memory and the computer program code are configured, with the at least one processor, to cause the apparatus further to:

determine, based on the indication, that mapping the first data session to the second data session at the target network node does not require switching to the second network slice;

decide to start user plane data communication on the second data session with the target network node upon completion of a random access process, thereby communicating on the first network slice with both the source network node and with the target network node during the handover process; and releasing the first data session with the source network node after the second data session with the target network node is ongoing.

3. The apparatus of claim 1, wherein the at least one memory and the computer program code are configured, with the at least one processor, to cause the apparatus further to:

determine, based on the indication, that mapping the first data session to the second data session at the target network node requires switching to the second network slice; and decide to communicate with the source network node on the first data session on the first network slice during the handover process and start user plane data communication on the second data session on the second network slice with the target network node only after the second data session on the second network slice at the target network node has been setup.

4. The apparatus of claim 3, wherein the at least one memory and the computer program code are configured, with the at least one processor, to cause the apparatus further to:

determine that the target network node does not support the first network slice; and avoid communicating with the target network node on the first network slice.

5. The apparatus of claim 3, wherein the at least one memory and the computer program code are configured, with the at least one processor, to cause the apparatus further to:

determine that the first network slice is overloaded in the target network node; and avoid communicating with the target network node on the first net-work slice.

6. The apparatus of claim 3, wherein starting the user plane communication with the target network node comprises switching from the first data session on the first network slice at the source network node to the second data session on the second network slice at the target network node.

7. The apparatus of claim 3, wherein starting the user plane communication with the target network node comprises releasing the first data session on the first network slice with the source network node only after the second data session on the second network slice with the target network node is ongoing.

8. The apparatus of claim 3, wherein the at least one memory and the computer program code are configured, with the at least one processor, to cause the apparatus further to:

send an indication to a core network where the apparatus indicates that slice remapping at the target network node is to be performed and that the apparatus comprises the dual active protocol stacks; and receive an acknowledgement from the core network according to which only the second network slice is allowed.

9. The apparatus of claim 8, wherein the indication to the core network is sent in a non-access stratum register request message or in a next generation application protocol path switch request.

10. The apparatus of claim 1, wherein starting the user plane communication with the target network node comprises at least starting to communicate user plane with the target network node in uplink direction.

11. The apparatus of claim 1, wherein the indication is received in a handover command received from the target network node or as an information element added by the source network node when transferring the handover command message from the target network node.

12. The apparatus of claim 1, wherein the at least one memory and the computer program code are configured, with the at least one processor, to cause the apparatus further to:

signal to the source network node a capability to support a dual active protocol stack, DAPS, remapping function.

13. The apparatus of claim 12, wherein the DAPS remapping function is defined as DAPS capability modified with the ability to start the user plane communication with the target network node only after the second data session on the second network slice at the target network node has been setup.

14. The apparatus of claim 1, wherein the apparatus is or is comprised in a user equipment.

15. An apparatus, comprising:

at least one processor and at least one memory including a computer program code, wherein the at least one memory and the computer program code are configured, with the at least one processor, to cause the apparatus to:

send a handover request of a user equipment from a source network node to a target network node, wherein the request indicates that:

a first data session between the source network node and the user equipment is on a first network slice, the user equipment is equipped with a dual active protocol stack enabling the user equipment to communicate with the source network node and with the target network node during the handover process, and the user equipment has ability to start the user plane communication with the target network node only after a second data session on a second network slice at the target network node has been setup;

receive a response from the target network node, the response indicating whether mapping the first data session to the second data session at the target network node requires switching to the second network slice; and send a message, based on the response, to the user equipment indicating whether mapping the first data session to the second data session at the target network node requires switching to the second network slice during the handover.

16. The apparatus of claim 15, wherein the at least one memory and the computer program code are configured, with the at least one processor, to cause the apparatus further to:

determine, based on the response from the target network node, that mapping the first data session to the second data session at the target network node requires switching to the second network slice; and include or transfer, in the message, information that mapping the first data session to the second data session at the target network node requires switching to the second network slice during the handover, wherein the indication configures the user equipment to:

start user plane data communication on the second data session with the target network node only after the setup of the second data session on the second network slice at the target network node is completed, and avoid communicating with the target network node on the first network slice.

17. The apparatus of claim 15, wherein the at least one memory and the computer program code are configured, with the at least one processor, to cause the apparatus further to:

continue the first data session on the first network slice with the user equipment during the handover process at least until the setup of the second data session on the second network slice at the target network node is completed.

18. An apparatus, comprising:

at least one processor and at least one memory including a computer program code, wherein the at least one memory and the computer program code are configured, with the at least one processor, to cause the apparatus to:

receive a handover request of a user equipment from a source network node at a target network node, wherein the request indicates that:

a first data session between the source network node and the user equipment is on a first network slice, the user equipment is equipped with a dual active protocol stack enabling the user equipment to communicate with the source network node and with the target network node during the handover process, and the user equipment has ability to start the user plane communication with the target network node only after a second data session on a second network slice at the target network node has been setup;

determine whether at least one of: the target network node supports the first network slice or the first network slice is overloaded; and transmit a response to the source network node, the response indicating, based on the determining, whether mapping the first data session to the second data session at the target network node during the handover requires switching to the second network slice.

19. The apparatus of claim 18, wherein the at least one memory and the computer program code are configured, with the at least one processor, to cause the apparatus further to:

build the response towards the user equipment;

include, in the response, information that mapping the first data session to the second data session at the target network node requires switching to the second network slice during the handover, wherein the information configures the user equipment to:

start user plane data communication on the second data session with the target network node only after the setup of the second data session on the second network slice at the target network node is completed, and avoid communicating with the target network node on the first network slice.

20. The apparatus of claim 19, wherein the at least one memory and the computer program code are configured, with the at least one processor, to cause the apparatus further to:

avoid communicating with the user equipment on the first network slice when the first network slice is not supported or when the first network slice is over-loaded; and start user plane data communication on the second data session with the user equipment only after the setup of the second data session using the second network slice at the target network node is completed.

* * * * *